Aug. 22, 1939.  R. W. BUSCH  2,170,772
COMB CLEANER
Filed May 14, 1938
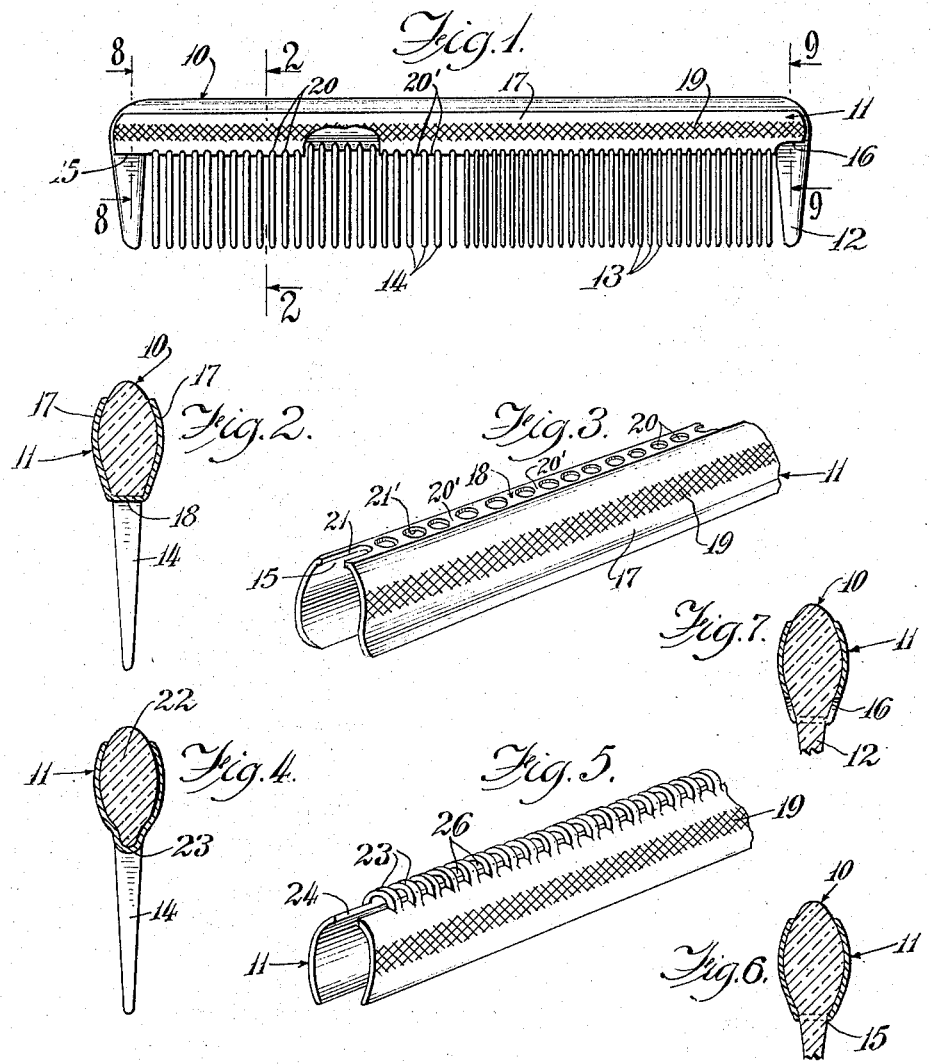
Inventor:
Robert Walter Busch
By David Maub[?]eller
Attorney Patented Aug. 22, 1939

2,170,772

UNITED STATES PATENT OFFICE 2,170,772

COMB CLEANER

Robert Walter Busch, Maywood, Ill., assignor of one-third to Frederick E. Hummel and one-third to Charles T. Patock, both of Chicago, Ill.

Application May 14, 1938, Serial No. 207,895

5 Claims. (Cl. 132—28)

The present invention relates to an accessory to be attached to combs and is used for cleaning the same.

One object of this invention is to provide a device which is attachable to a standard comb in the manner illustrated, and remains on the comb without interfering with its actual operation or utility, and which can be easily set into operation when it is desired to clean the comb of varied matter which has a tendency to accumulate at the roots of the teeth of a comb due to continued use.

Another object of this invention is the provision of an ornamental structure for a comb which enhances the design and the appearance of the comb embellishing the same by virtue of its attachment to a comb.

Another object of this invention is the provision of a plurality of toothed members which fit in between the teeth of a comb to function as a cleaning instrument or device.

Another object of this invention is the provision of a simple, practical, efficient device for the purpose in view which is also neat in appearance and economical to manufacture.

With the foregoing and other objects in view, the invention will be more fully described hereinafter, and will be more particularly pointed out in the claims added hereto.

In the drawing where like symbols refer to like or corresponding parts thruout the several views:

Fig. 1 is a front view of a comb showing the invention attached thereto.

Fig. 2 is a longitudinal cross-sectional view on the line 2—2 of Figure 1.

Fig. 3 is an isometric view of one form of the invention.

Fig. 4 is a modification of the invention illustrated in Figure 1.

Fig. 5 is an isometric view showing the invention modification illustrated in Figure 4 in cross-section.

Fig. 6 is a longitudinal cross-sectional view on the line 8—8 of Figure 1.

Fig. 7 is a longitudinal cross-sectional view on the line 9—9 of Figure 1.

By referring to the drawing in Figure 1, we notice a standard comb designated generally by the numeral 10, my invention being designated by numeral 11. It will be noticed also that the comb in accordance with standard manufacturing practice has two substantial teeth at each end designated by 12, and a series of fine teeth designated by 13 and also a series of coarser teeth designated by 14.

By referring to Figure 3 it will be noticed that my invention is generally of a U shaped structure, or oval U shaped structure having side portions 17, and a base portion designated by 18.

The side portions 17 are adapted to flex by virtue of the oval U shaped structure of the cleaner 11, which is preferably made of a springy material, the flexure permitting the top edges of the portion 17 to yield when the cleaner is attached to or removed from the back portions of the comb 10. The base portion is either drilled or slotted or perforated in order to accommodate the respective teeth of a comb.

It will be seen that the perforations designated by 20 are arranged in spaced relationship depending upon the respective spacing of the coarse teeth 14 and the fine teeth 13 of the comb 10, the portions 20' forming the scraping teeth by virtue of the edges 21'.

At each end of the member 11 is shown a slotted portion 21, which slotted portion is for making it easier and more convenient to replace the member 11 on the comb 10 once it is removed, or when it is originally attached to the comb 10.

The teeth 12, being large enter the slots 21 readily and furnish instant locating and gauging of the teeth 13 and 14 with respect to the perforations 20.

It will be noticed in Figure 1 as designated at 15 that the slotted portion is on the same level with the teeth 20' or the base portion of the invention, whereas the improved form shown at 16 designates the slotted portion cut somewhat higher than the toothed portion 20'.

To be more explicit, the end slots 21 facilitate, as well as indicate, the method of gauging the alignment of the cleaner 11 with respect to the comb 10. The end slots 21 cut to the level illustrated at 15 provide a foolproof indication showing the initial points of entry of the comb with regard to the cleaner. However when the slots 21 are cut to the level illustrated at 16, the teeth 12 will be permitted to engage the slots 21 before the teeth 13 or 14 can enter the slots 20 thus facilitating the operation of aligning or registering the teeth 13 or 14 with their respective openings 20.

In Figure 3, it will be noticed that my device or my invention designated numeral 11 may be knurled along part of each of the portions 17, by knurling such as is shown at 19, in order to assure a firmer grip when attaching or removing my device or during the operation of cleaning the comb.

In Figure 4, is shown a modified form of comb in cross-section and in configuration therewith my invention designated by 11 which has a substantial oval construction opened at the top and has an additional arcuate portion 23 at the closed end which fits substantially over the cross-sectional shape of the comb 22.

This is further illustrated in greater detail in Figure 5, where it will be noticed that I provide the oval U shaped piece 11 with arcuate portion 23 forming the cleaning teeth, and spaces 26 which fit over respective teeth of the comb proper, and also provides the slotted portions 24 which fit and locate themselves with respect to the substantial teeth 12 of the comb 10, whenever it is desired to attach the device to the comb.

This device may be manufactured from any type of material such as metal, fibre, paper pulp or any other kind of composition satisfactory for the purpose.

I believe that I have described fully this invention and the drawing taken in connection with the description should offer a clear understanding to those skilled in the art.

It can be seen that I have not only shown a simple, ornamental, practical, useful and efficient device for cleaning a comb, but an invention that should be very useful in cleaning a comb without hindering the efficiency of the comb.

It is obvious that various changes and modifications may be made in the details of construction, and I reserve the right to make such modifications and alterations as come within the purview of the herein description and the subjoined claims.

Having thus described my invention what I claim as new and desire to secure by Letters Patent is:

1. A comb cleaner, comprising a substantially oval U shaped structure, provided with comb cleaning teeth fitting alternately between the teeth of a comb, and having a flexible portion to fit snugly on the back of a comb.

2. A comb cleaner, comprising a substantially oval U shaped structure, provided with comb cleaning teeth portions fitting alternately between the teeth of a comb, a flexible springy portion to fit snugly and removably on the back portion of a comb, and slotted means for locating said comb cleaner on a comb.

3. A comb cleaner, comprising a substantially oval U shaped structure, provided with comb cleaning teeth portions fitting alternately between the teeth of a comb, a flexible springy portion to fit snugly and removably on the back portion of a comb, slotted means for conveniently locating said comb cleaner on a comb, and a knurled gripping portion to facilitate attaching and removing of said comb cleaner from a comb.

4. A comb cleaner, comprising a substantially oval U structure, provided with arcuate comb cleaning teeth portions fitting alternately between the teeth of a comb, a flexible spring portion to fit snugly and removably on the back portion of a comb, slotted means for conveniently locating said comb cleaner on a comb, and a knurled gripping portion to facilitate attaching and removing said comb cleaner from a comb.

5. A comb cleaner, comprising a substantially oval U shaped structure, provided with arcuate comb cleaning teeth portions fitting alternately between the teeth of a comb, a flexible springy portion adapted to fit snugly and removably on the back portion of a comb, slotted portions on each end of the said comb cleaner, one slotted portion having its lower edges located relatively above the edges of the said arcuate comb cleaning teeth, the other slotted portion having its lower edges in the same plane with the edges of the said arcuate comb cleaning teeth, and a knurled gripping portion to facilitate attaching, and removing said comb cleaner from a comb.

ROBERT WALTER BUSCH.